(12) United States Patent
Montione (10) Patent No.: US 11,034,247 B2
(45) Date of Patent: Jun. 15, 2021

(54) VEHICLE PROPULSION SYSTEM

(71) Applicant: Transportation IP Holdings, LLC, Norwalk, CT (US)

(72) Inventor: Joel Terence Montione, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/913,423

(22) Filed: Jun. 26, 2020

(65) Prior Publication Data

US 2020/0324655 A1    Oct. 15, 2020

Related U.S. Application Data

(63) Continuation-in-part of application No. 16/050,361, filed on Jul. 31, 2018, now Pat. No. 10,730,392.

(51) Int. Cl.
| | |
|---|---|
| *H02P 3/14* | (2006.01) |
| *H02P 3/18* | (2006.01) |
| *B60L 15/20* | (2006.01) |
| *B60L 50/60* | (2019.01) |
| *B60L 7/10* | (2006.01) |
| *B60K 1/00* | (2006.01) |
| *B60L 50/40* | (2019.01) |
| *B60K 1/04* | (2019.01) |
| *H01M 50/20* | (2021.01) |
| *B61C 3/00* | (2006.01) |

(52) U.S. Cl.
CPC ............... *B60L 15/20* (2013.01); *B60K 1/00* (2013.01); *B60K 1/04* (2013.01); *B60L 7/10* (2013.01); *B60L 50/40* (2019.02); *B60L 50/60* (2019.02); *H01M 50/20* (2021.01); *B61C 3/00* (2013.01); *H01M 2220/20* (2013.01)

(58) Field of Classification Search
CPC ................................. B60L 15/20; B60L 50/60
USPC ......................................................... 318/376
See application file for complete search history.

(56) References Cited

U.S. PATENT DOCUMENTS

| | | |
|---|---|---|
| 2015/0032301 A1 | 1/2015 | Lamba |
| 2017/0023737 A1 | 1/2017 | Chandran et al. |

OTHER PUBLICATIONS

Office Action for corresponding BR Application No. BR102019015748-8 (6 pages).

*Primary Examiner* — Erick D Glass
(74) *Attorney, Agent, or Firm* — Philip S. Hof; The Small Patent Law Group, LLC (57) ABSTRACT

A vehicle propulsion system includes a propulsion electrical storage device (PESD), a first switching device, an ancillary electrical storage device (AESD), a second switching device, and a controller. The PESD powers a traction motor of a vehicle via a propulsion circuit. The AESD is a different type of electrical storage device than the PESD and powers the traction motor via an ancillary circuit. The first switching device is electrically connected to the propulsion circuit, and the second switching device is electrically connected to the ancillary circuit. The controller switches or maintains the second switching device in a closed, conducting state during an elevated demand period for the AESD to power to the traction motor. The controller switches the second switching device to an open, non-conducting state prior to switching the first switching device to the closed state for the PESD to power the traction motor.

20 Claims, 3 Drawing Sheets

VEHICLE PROPULSION SYSTEM

CROSS-REFERENCE TO RELATED APPLICATIONS

This application is a continuation-in-part of U.S. application Ser. No. 16/050,361, filed on Jul. 31, 2018, which is incorporated by reference in its entirety.

FIELD

Embodiments of the subject matter described herein relate to vehicle propulsion systems, such as systems that can propel the vehicle along routes.

BACKGROUND

Some vehicles such as locomotives are beginning to utilize electrical storage power sources, such as batteries, for providing energy for propulsion, instead of or in addition to fuel-powered engines. The electrical storage power sources may be more efficient, more reliable, quieter, and/or produce fewer emissions than diesel engines and other fuel-powered engines. For example, some locomotives may include electrical storage devices, such as lithium ion batteries, that provide electric current to one or more alternating current (AC) traction motors. The traction motors convert electric current into mechanical energy that is used to rotate wheels and/or axles of the locomotive. Relying on a single type of electrical storage device for powering all tractive loads and demands of a locomotive, however, may exert stress on the electrical storage device that reduces the efficiency and/or operational lifetime of the electrical storage device.

For example, certain elevated demand situations along the course of a trip, such as initiating movement of the locomotive from a stationary position, accelerating, motoring along an incline grade, and the like, may apply a greater load on the electrical storage device than other situations such as cruising, braking, and traveling along a decline grade. For large freight trains, for example, that can weigh in excess of thousands of tons, the large inertial forces present during such elevated demand situations results in significant electric current drawn from the electrical storage device. Supplying the electrical current to meet the large demands during such elevated demand situations may significantly deplete the current supply within the electrical storage device, reducing operational efficiency and reducing the available travel range before recharging. Furthermore, the stress exerted on the electrical storage device and the heat generated during the elevated demand situations may degrade the electrical storage device and/or associated components, reducing the operational lifetime of these parts before replacement.

SUMMARY

In one or more embodiments, a vehicle propulsion system is provided that includes a propulsion electrical storage device, a first switching device, an ancillary electrical storage device, a second switching device, and a controller having one or more processors. The propulsion electrical storage device is electrically connected to a traction motor of a vehicle via a propulsion circuit and is configured to power the traction motor to provide tractive effort to propel the vehicle. The first switching device is electrically connected to the propulsion circuit between the propulsion electrical storage device and the traction motor. The ancillary electrical storage device is electrically connected to the traction motor via an ancillary circuit and is configured to power the traction motor. The ancillary electrical storage device is a different type of electrical storage device than the propulsion electrical storage device. The second switching device is electrically connected to the ancillary circuit between the ancillary electrical storage device and the traction motor. The controller is operatively connected to the first and second switching devices. The controller is configured to switch or maintain the second switching device in a closed state during an elevated demand period for the ancillary electrical storage device to supply electric current to the traction motor via the ancillary circuit to power the traction motor. The controller is configured to switch the second switching device to an open state to block conduction along the ancillary circuit prior to switching the first switching device from the open state to the closed state to enable the propulsion electrical storage device to supply electric current to the traction motor via the propulsion circuit to power the traction motor.

In one or more embodiments, a vehicle propulsion system is provided that includes a lithium ion battery pack, a first switching device, an ancillary electrical storage device, a second switching device, and a controller having one or more processors. The lithium ion battery pack is electrically connected to a traction motor of a vehicle via a propulsion circuit and is configured to power the traction motor to provide tractive effort to propel the vehicle. The first switching device is electrically connected to the propulsion circuit between the lithium ion battery pack and the traction motor. The ancillary electrical storage device is electrically connected to the traction motor via an ancillary circuit and is configured to power the traction motor. The ancillary electrical storage device includes or represents ultra-capacitors. The second switching device is electrically connected to the ancillary circuit between the ancillary electrical storage device and the traction motor. The controller is operatively connected to the first and second switching devices. The controller is configured to switch or maintain the second switching device in a closed state during an elevated demand period for the ancillary electrical storage device to supply electric current to the traction motor via the ancillary circuit to power the traction motor. The controller is configured to switch the second switching device to an open state to block conduction along the ancillary circuit prior to switching the first switching device from the open state to the closed state to enable the lithium ion battery pack to supply electric current to the traction motor via the propulsion circuit to power the traction motor.

In one or more embodiments, a vehicle propulsion system is provided that includes a lithium ion battery pack, a first switching device, an ancillary electrical storage device, a second switching device, and a controller having one or more processors. The lithium ion battery pack is electrically connected to a traction motor of a vehicle via a propulsion circuit. The lithium ion battery pack is configured to power the traction motor to provide tractive effort to propel the vehicle. The first switching device is electrically connected to the propulsion circuit between the lithium ion battery pack and the traction motor. The ancillary electrical storage device is electrically connected to the traction motor via an ancillary circuit and configured to power the traction motor. The ancillary electrical storage device includes ultra-capacitors. The second switching device is electrically connected to the ancillary circuit between the ancillary electrical storage device and the traction motor. The first and second switching devices are solid state switches or optical switches. The controller is operatively connected to the first and second switching devices and is configured control the first and second switching devices such that at least one of the first and second switching devices is in an open, non-conducting state at any given moment in time to ensure that the propulsion circuit and the ancillary circuit do not both conduct electric current during a common time period.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide systems and methods that power propulsion of a vehicle system, such as a locomotive. The vehicle system includes multiple different types of electrical storage devices that store electric current for use in propelling the vehicle system. For example, the electrical current supplied from each of the multiple different types of electrical storage devices powers one or more traction motors to generate tractive forces. One of the electrical storage devices may be a main or primary device that is utilized to power the one or more traction motors during a majority of a trip of the vehicle system. Another of the electrical storage devices may be an ancillary or secondary device that is utilized to power the one or more traction motors during a minority of the trip of the vehicle system. The ancillary electrical storage device may be specifically utilized to conserve the electric current supply stored within the main electrical storage device, to increase the efficiency of the main electrical storage device, to reduce the stress applied on the main electrical storage device, to increase the operational lifetime of the main electrical storage device, and/or to increase the available travel range of the vehicle system between charges.

The systems and method described herein can be used for controlling various different types of vehicle systems, such as railway vehicles, automobiles (e.g., autonomous cars and trucks), off-highway vehicles, marine vessels, and the like. Each vehicle system that is controlled by the systems and methods described herein may include only a single vehicle or multiple vehicles. In the vehicle systems with multiple vehicles, the vehicles may be mechanically and/or logically coupled together to move together along a route.

Figure 1:
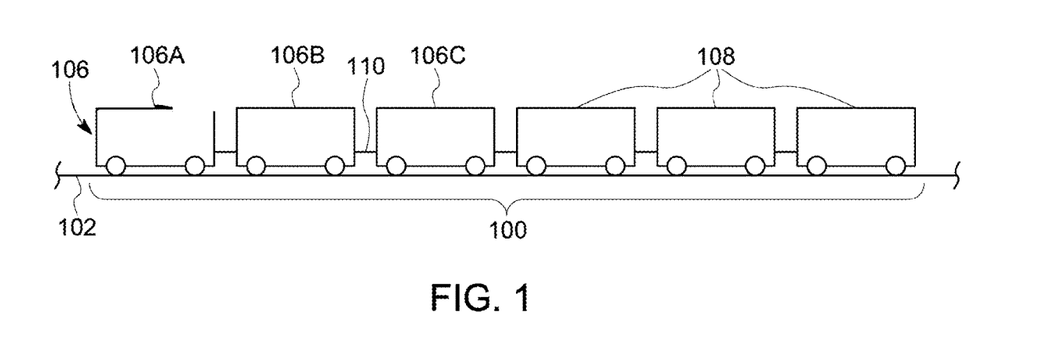
FIG. 1 illustrates a schematic diagram of a vehicle system traveling along a route according to an embodiment.

FIG. 1 illustrates a schematic diagram of a vehicle system 100 traveling along a route 102 according to an embodiment. The vehicle system 100 includes multiple vehicles 106, 108 that travel together along the route 102. The vehicles 106 represent propulsion-generating vehicles that can generate propulsive force to propel the vehicle system 100 along the route 102. The vehicle system 100 in the illustrated embodiment has three propulsion-generating vehicles 106A, 106B, 106C, which may represent a consist. The vehicles 108 represent non-propulsion-generating vehicles that are incapable of generating propulsive force to propel the vehicle system 100 along the route 102. The non-propulsion-generating vehicles 108 may be used for carrying cargo and/or passengers. The non-propulsion-generating vehicles 108 may be rail cars, trailers, or other vehicle units that are propelled along the route 102 by the propulsion-generating vehicles 106, which may represent locomotives, truck tractors, or the like.

In the illustrated embodiment, the vehicle system 100 is a train that includes multiple locomotives 106 and multiple passive rail cars 108 pulled by the locomotives 106 along a track representative of the route 102. Each of the locomotives 106 may weigh in excess of 100 tons (e.g., 200,000 lbs.). While three locomotives 106 and three rail cars 108 are shown in the illustrated embodiment, the train 100 may have different numbers and/or arrangements of the locomotives 106 and rail cars 108. For example, the train 100 may be a freight train that conveys cargo, and may include hundreds of the rail cars 108. The train 100 may have a combined or collective weight in excess of 1,000 tons. In an alternative embodiment, the vehicle system 100 may be a tractor trailer that includes a truck tractor 106 that pulls one or more passive trailers 108. In other embodiments, the vehicle system 100 may be or include an off-highway vehicle (such as a mining truck), a marine vessel, an automobile, or the like.

The vehicles 106, 108 are mechanically connected with each other, such as by couplers 110, to form a string of interconnected vehicles. Although the propulsion-generating vehicles 106A-C are shown as being directly coupled with each other, two or more of the propulsion-generating vehicles 106A-C may be separated from one another by one or more of the vehicles 108 in an alternative embodiment. The vehicle system 100 can coordinate the operations of the propulsion-generating vehicles 106 as the vehicle system 100 travels along the route 102 during a trip.

In an alternative embodiment, the vehicles 106, 108 are not mechanically connected to each other, but rather are spaced apart from one another with a controlled spacing between adjacent vehicles 106, 108. For example, in such an alternative embodiment, the vehicles 106, 108 may be logically and operationally connected via a communication network that controls the speed, orientation, and/or spacing of the vehicles 106, 108 to travel together along the route 102.

Figure 2:
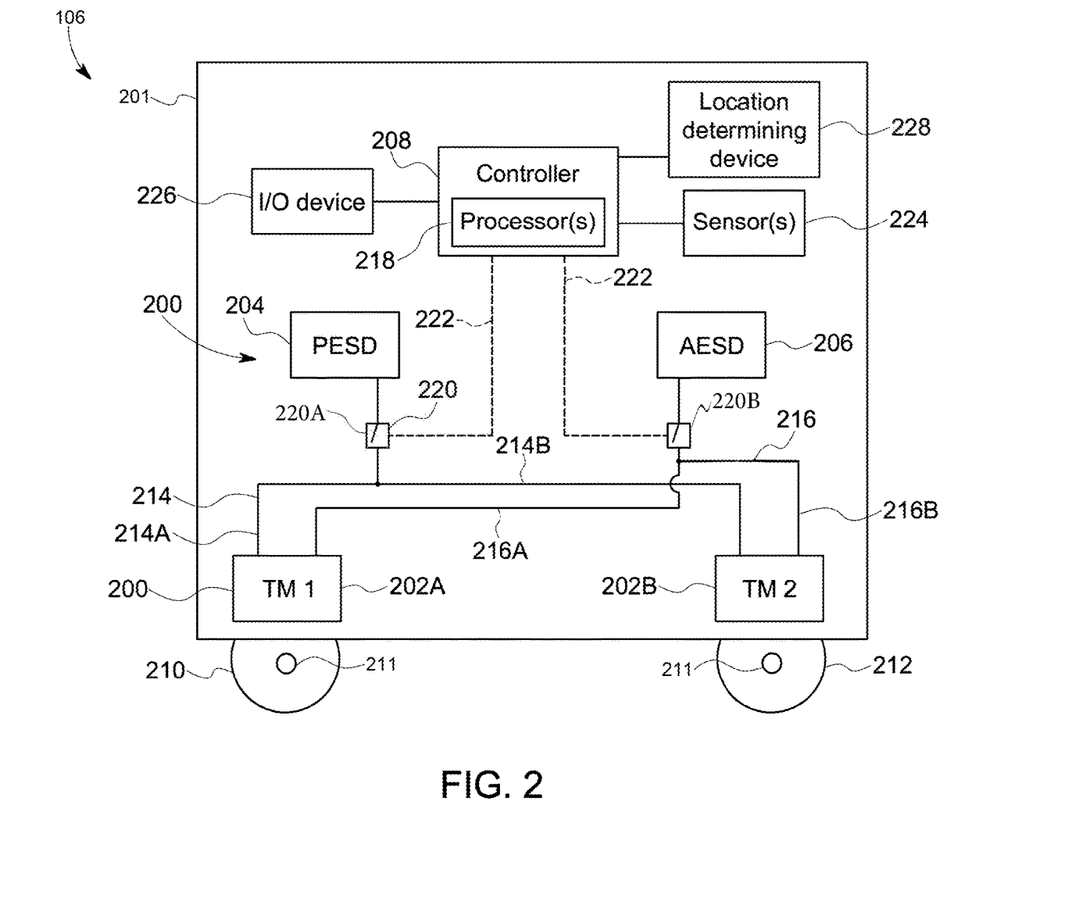
FIG. 2 is a schematic diagram of one propulsion-generating vehicle of the vehicle system shown in FIG. 1 according to an embodiment.

FIG. 2 is a schematic diagram of one of the propulsion-generating vehicles 106 of the vehicle system 100 shown in FIG. 1 according to an embodiment. The propulsion-generating vehicle 106 (referred to herein as vehicle 106) may be a locomotive that is configured to travel on rails of tracks, as described above with reference to FIG. 1. Alternatively, the vehicle 106 may be a different type of vehicle than a locomotive, such as a road-based truck or automobile (e.g., designed for traveling on public roadways), an off-highway vehicle (e.g., a vehicle not designed for or permitted to travel on public roadways), a marine vessel, or the like. The vehicle 106 may be solitary or may be mechanically or logically coupled to one or more other vehicles to move together along the route 102 (shown in FIG. 1).

The vehicle 106 includes a propulsion system 200 for generating propulsive forces to propel the vehicle 106 along the route 102. In embodiments in which the vehicle 106 is a locomotive, the propulsion system 200 is a locomotive propulsion system. The propulsion system 200 includes one or more traction motors 202, a propulsion electrical storage device 204, an ancillary electrical storage device 206, a controller 208, and various associated circuitry and electrical devices (e.g., transformers, converters, inverters, and the like). The propulsion system 200 may include more or less components than described and shown in FIG. 2. The propulsion system 200 is at least partially disposed onboard the vehicle 106. For example, in FIG. 2, all of the components of the propulsion system 200 are disposed onboard the vehicle 106, e.g., the components may be attached to and supported by a vehicle platform 201, meaning a chassis or other support structure. In an alternative embodiment, a portion of the propulsion system 200, such as the controller 208, the propulsion electrical storage device 204, and/or the ancillary electrical storage device 206, may be located on a different vehicle of the vehicle system 100 (shown in FIG. 1) other than the illustrated vehicle 106.

The propulsion system 200 of the vehicle 106 includes two traction motors 202 in the illustrated embodiment. A first traction motor 202A (indicated as "TM 1" in FIG. 2) is coupled to a first wheel set 210 of the vehicle 106 (having a wheels and an axle 211), and a second traction motor 202B (indicated as "TM 2" in FIG. 2) is coupled to a second wheel set 212 of the vehicle 106 (also having respective wheels and an axle 211). The traction motors 202 may be alternating current (AC) induction motors. For example, the traction motors 202 may have a respective rotor that rotates relative to a stator to convert electrical energy to mechanical energy, and vice-versa. According to one or more embodiments, the traction motors 202 selectively receive electrical current from the electrical storage devices 204, 206, and utilize the electrical energy to generate mechanical tractive effort or forces (e.g., torque) for rotating the corresponding wheel sets 210, 212 to propel the vehicle 106. The propulsion system 200 may have only one traction motor 202 or at least three traction motors 202 in an alternative embodiment. The vehicle 106 may include more than two wheel sets 210, 212. In an example embodiment, the vehicle 106 has six total wheel sets 210, 212, and at least four traction motors 202 operatively connected to at least four of the wheel sets 210, 212.

In addition to providing propulsive forces for accelerating the vehicle 106, the traction motors 202 may be selectively controlled to provide braking effort to slow the vehicle 106 during regenerating braking periods. During a regenerative braking period, the traction motors 202 operate as generators such that input mechanical energy from the rotating wheel sets 210, 212 is utilized by the traction motors 202 to generate electrical energy. The electrical energy generated during regenerative braking may be conveyed to one or both of the electrical storage devices 204, 206 for charging as the vehicle 106 moves along the route.

In one or more embodiments, the propulsion system 200 of the vehicle 106 lacks an internal combustion engine. For example, the vehicle 106 does not have a diesel engine or other onboard fuel-consuming engine that generates power for propulsion. The vehicle 106 may be entirely powered by electric current that is stored within the onboard electrical storage devices 204, 206. Optionally, the vehicle 106 may be configured to receive electrical energy from off-board the vehicle 106 as the vehicle 106 moves along the route, such as from a catenary line, an electrified rail, or a wayside device. In another embodiment, the vehicle 106 may be a hybrid vehicle that also includes a fuel-consuming engine.

The propulsion electrical storage device 204 (also referred to herein as PESD 204) is electrically connected to the traction motors 202 via a propulsion circuit 214. The propulsion circuit 214 is a conductive pathway defined by one or more electrical conductors, such as wires, cables, integrated circuits, or the like. The PESD 204 is configured to supply electric current to the traction motors 202 via the propulsion circuit 214 to power the traction motors 202 for generating tractive effort to propel the vehicle 106. In the illustrated embodiment, the propulsion circuit 214 splits into a first propulsion circuit branch 214A connected to the first traction motor 202A and a second propulsion circuit branch 214B connected to the second traction motor 202B. Both the first and second traction motors 202A, 202B receive electric current supplied by the PESD 204 via the propulsion circuit 214.

The ancillary electrical storage device 206 (also referred to herein as AESD 206) is electrically connected to the traction motors 202 via an ancillary circuit 216. The ancillary circuit 216 is a conductive pathway defined by one or more electrical conductors, such as wires, cables, integrated circuits, or the like. The AESD 206 is configured to supply electric current to the traction motors 202 via the ancillary circuit 216 to power the traction motors 202 for generating tractive effort to propel the vehicle 106. In the illustrated embodiment, the ancillary circuit 216 splits into a first ancillary circuit branch 216A connected to the first traction motor 202A, and a second ancillary circuit branch 216B connected to the second traction motor 202B. Both the first and second traction motors 202A, 202B receive electric current supplied by the AESD 206 via the ancillary circuit 216.

In an embodiment, the ancillary circuit 216 is separate and discrete from the propulsion circuit 214. For example, the wires, cables, and/or integrated circuits that form the ancillary circuit 216 may be different, and electrically isolated, from the wires, cables, and/or integrated circuits that form the propulsion circuit 214. Providing a first conductive pathway or pathways from the PESD 204 to the one or more traction motors 202 and a second conductive pathway or pathways from the AESD 206 to the one or more traction motors 202 ensures that the PESD 204 and the AESD 206 remain electrically isolated and that there is no mixing or blending of current between the PESD 204 and the AESD 206.

Although each of the circuits 214, 216 splits into two respective branches in FIG. 2, in an alternative embodiment each of the circuits 214, 216 is defined by multiple discrete and separate respective conductive pathways. In such an alternative embodiment, the two branches 214A, 214B of the propulsion circuit 214 may remain discrete from one another and separately connect to the PESD 204 instead of combining at an intermediate location between the PESD 204 and the traction motors 202 as shown in FIG. 2. Similarly, the two branches 216A, 216B of the ancillary circuit 216 may remain discrete from one another and separately connect to the AESD 206.

In an alternative embodiment, the propulsion circuit 214 and the ancillary circuit 216 may share at least a length of conductive pathway. For example, both circuits 214, 216 may share a segment of wire, cable, and/or integrated circuitry that connects to a traction motor, and the circuits 214, 216 divulge into separate and discrete conductive pathways to the different respective electrical storage devices 204, 206. In this alternative embodiment, the electrical storage device 204, 206 are electrically isolated from each other via the operation of switching devices 220 along the propulsion and ancillary circuits 214, 216.

The controller 208 is operatively connected to the propulsion circuit 214 and to the ancillary circuit 216, and is configured to selectively control the conduction of electric current along the circuits 214, 216. For example, the controller 208 may generate and transmit control signals to the circuits 214, 216 to selectively form a closed circuit path along the circuits 214, 216 and to selectively form an open circuit path (e.g., break the closed circuit path) along the circuits 214, 216. The formation of the closed circuit path along a given circuit 214, 216 establishes conduction of electric current through that circuit 214, 216, and the formation of the open circuit path blocks or prohibits conduction of electric current through the circuit 214, 216. The controller 208 may be operatively connected to switching devices 220 integrated on the circuits 214, 216. For example, a first switching device 220A is disposed along and electrically connected to the propulsion circuit 214, and a second switching device 220B is disposed along and electrically connected to the ancillary circuit 216. The switching devices 220 are controllable to open (e.g., break) and close (e.g., connect) conductive circuit paths along the corresponding circuits 214, 216. The controller 208 is configured to transmit control signals to the switching devices 220 to individually control each of the switching devices 220 between a respective closed (e.g., conducting) state and an open (e.g., non-conducting) state. The controller 208 may provide energy management services for the vehicle 106, as the controller 208 regulates and controls the flow of electric current to and from the traction motors 202.

The controller 208 is operatively connected to the switching devices 220 via conductive wires 222 in the illustrated embodiment, but may be wirelessly connected to the switching devices 220 in an alternative embodiment. In the illustrated embodiment, each of the switching devices 220A, 220B is individually controlled by the controller 208. For example, the controller 208 can generate control signals to close the switching device 220B of the ancillary circuit 216 and establish conduction of electric current along the ancillary circuit 216 while retaining the switching device 220A of the propulsion circuit 214 in the open state to block conduction of electric current along the propulsion circuit 214. The switching devices 220 are disposed along the shared segments of the circuits 214, 216 in the illustrated embodiment such that closing the switching device 220B on the ancillary circuit 216 directs electric current from the AESD 206 to both of the traction motors 202A, 202B, and opening the switching device 220B stops conducting electric current to both of the traction motors 202A, 202B. Optionally, the switching devices 220 may be configured to switch between the open and closed states responsive to receipt of a control signal, or the switching devices 220 may switch states responsive to the lack of receipt of a control signal. The propulsion system 200 may have more or less than two switching devices 220A, 220B in an alternative embodiment. For example, the propulsion system 200 may have four switching devices, and each switching device is disposed along a different one of the branches 214A, 214B, 216A, 216B to allow for individual control of current supply to each of the traction motors 202.

In an embodiment, the switching devices 220 may be electromechanical contactors (e.g., electrical relays) that are configured to withstand relatively high electric current and voltage along the circuits 214, 216. The contactors may have solenoids that convert electrical energy of the control signals received from the controller 208 to mechanical energy that moves contacts within the contactors into engagement to establish conduction and out of engagement to block conduction.

In another embodiment, the switching devices 220 may be solid state switches (e.g., solid state relays). Unlike electromechanical contactors or relays which use coils, magnetic fields, springs and mechanical contacts, solid state relays utilize electrical and optical properties of solid-state semiconductors and have no moving parts. The solid-state switches may also avoid the risk of arcing while switching between the open and closed states. Based on the relatively high energy densities (or loads) conducted through the circuits 214, 216 to and from the traction motors, the propulsion system 200 may also include a solid-state ground fault scheme. In still another embodiment, the switching devices 220 may be optical switches. Optical switches inherently provide electrical isolation. For example, each switching device 220 may include an insulated-gate bipolar transistor (IGBT), MOSFET, or other transistor that has optical interfaces (e.g., an LED-to-photoreceptor isolated input, or other optical isolator control input interface) to preclude electrical noise and interference risk.

The controller 208 includes or represents one or more processors 218 and/or other logic-based device(s) that perform operations based on instructions stored on a tangible and non-transitory computer readable storage medium or memory. The controller 208 may additionally or alternatively include one or more hard-wired devices that perform operations based on hard-wired logic of the devices. The controller 208 may represent the hardware that operates based on software or hardwired instructions, the software that directs hardware to perform the operations, or a combination thereof. The operations performed by the controller 208 (e.g., the one or more processors 218 thereof) are described in more detail with reference to FIGS. 3 through 5.

In one or more embodiments, the propulsion electrical storage device (PESD) 204 is a different type of electrical storage device than the ancillary electrical storage device (AESD) 206. The two electrical storage devices 204, 206 may have different chemistry, such that the devices 204, 206 store charge using different mechanisms and materials. The electrical storage devices 204, 206 may be selected to have different properties and characteristics, and may be utilized by the controller 208 to power the traction motors 202 in different situations and circumstances based on the different inherent properties and characteristics of the devices 204, 206. In at least one embodiment, the AESD 206 charges and discharges faster (e.g., in less time elapsed) than the PESD 204. The PESD 204 may have a greater energy storage capacity than the AESD 206. For example, the PESD 204 may be able to store a greater amount of electric charge (e.g., current) than the AESD 206. As a result, the PESD 204 may be able to supply more power to the traction motors 202 during a single charge than the power that can be supplied to the traction motors 202 by the AESD 206 during a single charge.

As should be appreciated based on the above and elsewhere herein, different "types" refers to electrical storage devices that have one or more of different chemistries (how the devices store energy electro-chemically), different storage capacities, and/or different charge/discharge characteristics. In one embodiment, different types of storage devices have different chemistries, different capacities, and different charge/discharge characteristics.

Due to the different properties and characteristics of the devices 204, 206, the controller 208 may be configured to utilize the PESD 204 as a main or primary energy source that powers the traction motors 202 during a majority of a trip of the vehicle 106. The controller 208 may utilize the AESD 206 as an auxiliary or supplemental energy source to power the traction motors 202 during a minority of the trip of the vehicle 106. For example, the controller 208 may utilize the AESD 206 during elevated demand periods to conserve the energy supply within the PESD 204 and avoid stress on the PESD 204 during such elevated demand periods. The elevated demand periods may include starting a locomotive from a stopped position for the purpose of moving a locomotive for short distances around a railroad yard or depot or for creating momentum prior to engaging and utilizing the PESD 204 to power the traction motors 202 for revenue service. In one or more embodiments, the controller 208 successively utilizes the electrical storage devices 204, 206 one at a time, such that the traction motors 202 do not receive electric current from both electrical storage devices 204, 206 during a common time period.

In the illustrated embodiment, the PESD 204 and the AESD 206 are operatively connected to the same traction motors 202 (e.g., the first and second traction motors 202A, 202B). Alternatively, the PESD 204 and the AESD 206 may not be operatively connected to all of the same traction motors 202. For example, the PESD 204 may be connected to the first and second traction motors 202A, 202B via the propulsion circuit 214, as shown in FIG. 2, and the AESD 206 may be connected to the second traction motor 202B and a third traction motor (not shown) via the ancillary circuit 216. The first traction motor 202A therefore may be dedicated to the PESD 204 only, and the third traction motor may be dedicated to the AESD 206 only. Thus, during elevated demand periods, the AESD 206 is directed to supply electric current to the second traction motor 202B and the third traction motor to propel the vehicle 106, while the first traction motor 202A is non-utilized. Outside of the elevated demand periods, the PESD 204 may be directed to supply current to the first and second traction motors 202A, 202B to propel the vehicle 106, while the third traction motor is non-utilized.

In an embodiment, the PESD 204 includes one or more battery cells. The PESD 204 may have multiple battery cells connected together in a battery pack. The battery cells may include lithium. For example, the battery cells may be lithium ion battery cells, lithium metal battery cells, or the like. The battery cells may be secondary (e.g., rechargeable) cells. In an embodiment, the AESD 206 includes one or more capacitors. For example, the AESD 206 may be defined by multiple ultra-capacitors (or supercapacitors). The ultra-capacitors may include or represent electrostatic double-layer capacitors, hybrid capacitors, pseudo-capacitors, or the like. Optionally, the AESD 206 may include conventional electrolytic capacitors, featuring a solid dielectric layer between electrodes, in addition to the ultra-capacitors. The PESD 204 and/or the AESD 206 may have a different structural and chemical make-up in an alternative embodiment.

Optionally, the vehicle 106 includes one or more sensors 224 that are operatively connected with the controller 208. The one or more sensors 224 are configured to monitor operation of various components of the propulsion system 200 and obtain data representative of operational parameters of the corresponding components. For example, the one or more sensors 224 may include or represent temperature sensors that measure the temperature of the electrical storage devices 204, 206; electrical sensors that measure electric current stored within the electrical storage devices 204, 206 and/or supplied along the circuits 214, 216; or the like.

The vehicle 106 optionally also includes an input and output device 226 (referred to herein as I/O device 226) that is operatively connected with the controller 208. The input component(s) of the I/O device 226 may include a keyboard, pedal, button, lever, microphone, touchscreen, or the like, and the output component(s) may include a speaker, a display screen, a light, or the like. The I/O device 226 may be used by an operator to input control instructions to the propulsion system 200 and/or to monitor operations of the propulsion system 200. For example, an operator may utilize the I/O device 226 to select between the PESD 204 and the AESD 206 as the source of electric current for the traction motors 202 at specific times during a trip.

The vehicle 106 optionally includes a location determining device 228 that determines a location of the vehicle 106 as the vehicle 106 travels during a trip. The location determining device 228 may be a global positioning system (GPS) receiver that obtains location data (e.g., coordinates) representative of the location of the vehicle 106. The controller 208 is communicatively coupled, via one or more wired or wireless connections, to the location determining device 228. The controller 208 (e.g., the processor(s) thereof) may be configured to analyze the location data to determine the location of the vehicle 106 at various times during a trip. The controller 208 may compare the location data of the vehicle 106 to a map or trip schedule to determine a level of progress of the vehicle 106 along the route and/or proximity of the vehicle 106 to one or more locations of interest, such as a destination or another scheduled stop location.

In an embodiment in which the vehicle system 100 includes multiple propulsion-generating vehicles 106 (e.g., the embodiment shown in FIG. 2), each of the propulsion-generating vehicles 106 may have a respective propulsion system 200 that includes all of the components shown in FIG. 2. Alternatively, only one of the multiple propulsion-generating vehicles 106 includes the controller 208, and that controller 208 communicates control signals to the other propulsion-generating vehicles 106 to control the propulsion systems on those vehicles 106.

Figure 3:
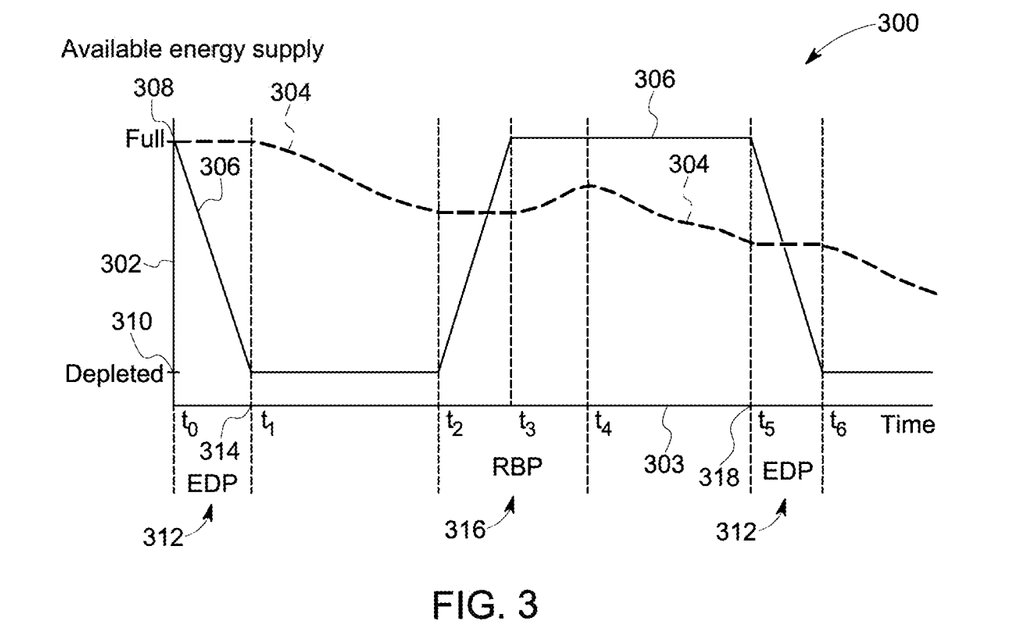
FIG. 3 is a graph showing available energy supply within each of a propulsion electrical storage device (PESD) and an ancillary electrical storage device (AESD) of the propulsion-generating vehicle over time during a trip according to an embodiment.

FIG. 3 is a graph 300 showing available energy supply within each of the propulsion electrical storage device (PESD) 204 (shown in FIG. 2) and the ancillary electrical storage device (AESD) 206 (FIG. 2) of the vehicle 106 (FIG. 2) over time during a trip according to an embodiment. The vertical axis 302 of the graph 300 represents available energy supply. The horizontal axis 303 of the graph 300 represents time. The graph 300 is provided to illustrate how the controller 208 (shown in FIG. 2) may control the supply of electric current from each of the electrical storage devices 204, 206 to power the traction motors 202 (FIG. 2) in order to conserve the energy supply stored within the PESD 204 and extend the operational lifetime of the PESD 204 by reducing stress and heat-related effects on the PESD 204. The plot line 304 represents the available energy supply of the PESD 204 over time, and the plot line 306 represents the available energy supply of the AESD 206 over time.

In the graph 300, both of the available energy supplies 304, 306 of the electrical storage devices 204, 206 are indicated as having a full level 308 at time $t_0$, such that the storage devices 204, 206 have full charges. It is recognized that the PESD 204 may store more electrical energy than the AESD 206, such that the PESD 204 at the full level 308 may have significantly more electrical energy than the AESD 206 at the full level 308. The available energy supply axis 302 is a qualitative scale and extends from the full level 308 to a depleted level 310. The depleted level 310 may represent that no additional electrical current is available to be supplied from the respective electrical storage device 204, 206 for powering a load, such as the traction motors 202. At the depleted level 310, the electrical storage devices 204, 206 may hold no electric current or, alternatively, may still hold some electric current but no electrical current that is available for powering a load.

The vehicle 106 is stationary at time $t_0$. The period of time from $t_0$ to $t_1$ represents an initial movement period in which the vehicle 106 starts moving from the stationary position. As described above, the vehicle 106 may be heavy, weighing in excess of 100 tons, and may be utilized to pull additional passive vehicles 108 (shown in FIG. 1). Due to the heavy weight, significant force (e.g., torque) is required to overcome inertia and cause the vehicle 106 to start moving and to accelerate to a designated speed. The initial movement period is referred to as an elevated demand period 312 because the electrical load (e.g., power) that is demanded of the electrical storage devices 204, 206 exceeds a designated threshold (and is greater relative to lower demands during other time periods).

Figure 4:
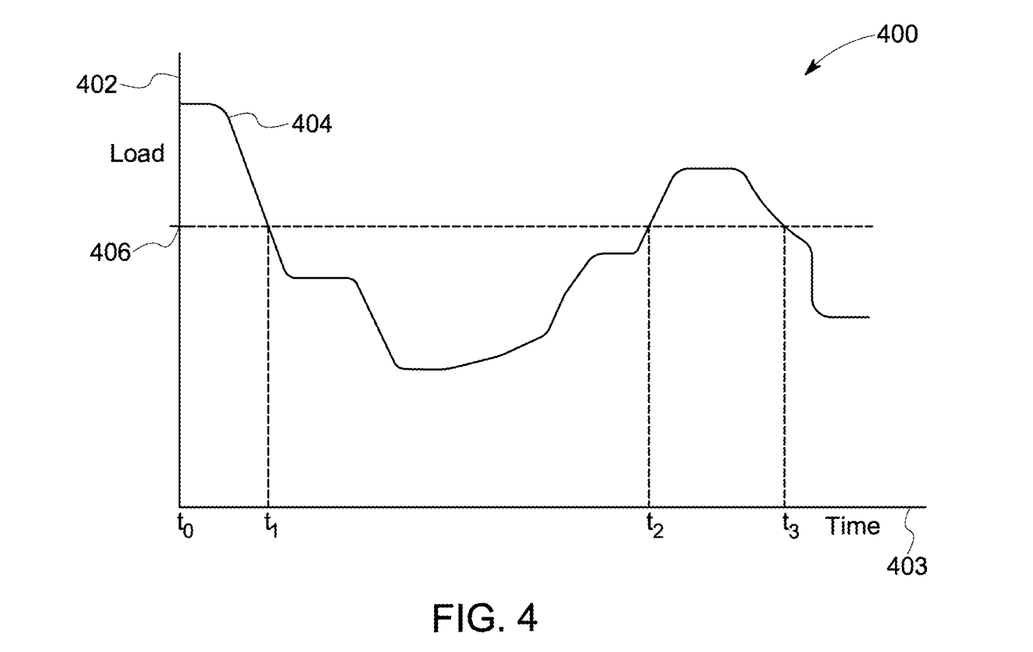
FIG. 4 is a graph showing electrical load that is demanded of the propulsion and ancillary electrical storage devices over time during a trip of the propulsion-generating vehicle according to an embodiment.

FIG. 4 is a graph 400 showing electrical load that is demanded of the electrical storage devices 204, 206 (shown in FIG. 2) over time during a trip of the vehicle 106 (FIG. 2) according to an embodiment. The vertical axis 402 represents electrical load, and the horizontal axis 403 represents time. The plot line 404 represents the electrical load at different times during the trip. The vehicle 106 starts moving from a stationary position at time $t_0$, similar to FIG. 3. The electrical load 404 at time $t_0$ exceeds a designated threshold 406. The load 404 exceeds the threshold 406 from time $t_0$ to time $t_1$, representing an elevated demand period 312.

The designated threshold 406 may be determined based on the type of vehicle 106 and the type of PESD 204. For example, the designated threshold 406 may be selected such that electrical loads applied to the PESD 204 that exceed the threshold 406 may exert unsustainable levels of strain and stress on the PESD 204. For example, although the PESD 204 may be able to meet the power demands of the loads in excess of the threshold 406, the loads may consume a significant amount of current stored in the PESD 204, thereby diminishing the available energy supply within the PESD 204 and shortening the available range that the vehicle 106 can travel before requiring an external power source to charge (e.g., recharge) the PESD 204. Furthermore, the strain and stress may cause the PESD 204 to generate significant heat and may degrade the PESD 204. Thus, repeated reliance on the PESD 204 to supply electric current to power the traction motors 202 to initiate movement of the vehicle 106 from a stationary position may degrade the PESD 204 over time, reducing the efficiency of the PESD 204, the capacity of the PESD 204, and/or the operational lifetime of the PESD 204.

The designated threshold 406 may be selected such that electrical loads applied to the PESD 204 that do not exceed the threshold 406 may exert more sustainable levels of stress and strain on the PESD 204. For example, loads less than or equal to the threshold 406 may not cause the PESD 204 to generate as much heat, and may not degrade the PESD 204 as much as elevated loads, which allows the PESD 204 to operate more efficiently and with a greater operational lifetime than when exposed to elevated loads.

Referring now back to FIGS. 2 and 3, the controller 208 of the vehicle 106 is configured to utilize the AESD 206 to supply electric current to the traction motors 202 to power the traction motors 202 during the elevated demand periods 312. For example, during the elevated demand period 312 between times $t_0$ and $t_1$, the controller 208 establishes conduction of electric current from the AESD 206 to the traction motors 202 along the ancillary circuit 216. The controller 208 may establish the conductive pathway by communicating control signals that cause the switching device 220 on the ancillary circuit 216 to adopt the closed, conducting state.

In one or more embodiments, the controller 208 blocks conduction of electric current from the PESD 204 to the traction motors 202 along the propulsion circuit 214 during the elevated demand periods 312 in order to conserve the available energy supply within the PESD 204 and to avoid the stress and strain (and the heat) that would be exerted on the PESD 204 to meet the elevated loads. The controller 208 may block the conduction by communicating control signals that cause the switching device 220 on the propulsion circuit 214 to adopt the open, non-conducting state, which breaks the conductive pathway along the propulsion circuit 214.

As shown in FIG. 3, during the elevated demand period 312 that occurs during initial movement of the vehicle 106 from a stationary position, the available energy supply 306 of the AESD 206 decreases because the AESD 206 is utilized to power the traction motors 202. The available energy supply 304 of the PESD 204 remains constant at the full level 308 during the initial elevated demand period 312 because the PESD 204 does not supply electric current to the traction motors 202. In the illustrated embodiment, the available energy supply 306 of the AESD 206 drops from the full level 308 at time $t_0$ to the depleted level 310 at time $t_1$.

In the illustrated embodiment, the initial elevated demand period 312 ends at time $t_0$. At the end 314 of the elevated demand period 312, the controller 208 is configured to control the ancillary circuit 216 to stop conducting electric current from the AESD 206 before directing the PESD 204 to supply electric current to the traction motors 202 via the propulsion circuit 214 to power the traction motors 202. For example, the controller 208 may communicate one or more control signals that that cause the switching device 220 on the ancillary circuit 216 to adopt the open, non-conducting state to break the conductive pathway between the AESD 206 and the traction motors 202. The controller 208 may subsequently communicate one or more control signals that cause the switching device 220 on the propulsion circuit 214 to adopt the closed, conducting state to establish a conductive pathway between the PESD 204 and the traction motors 202. Therefore, after the elevated demand period 312 ends, the PESD 204 is engaged and utilized for supplying electric current to power the traction motors 202, while the AESD 206 is disconnected from the traction motors 202.

The elevated demand period 312 is associated with acceleration operations, such initial movement from stationary, traversing up grade (such as hills), and/or substantial speed changes (e.g., greater than 5 mph or 10 mph). As described herein, the AESD 206 can be controlled to power the vehicle system (e.g., the traction motors 202) during the acceleration operations, which are typically short-duration and high-loading. The PESD 204 can be reserved for powering the vehicle system during momentum operations, such as general cruise movement of the vehicle system where the vehicle speed and acceleration have little variation over time. Reducing the load on the PESD 204 can increase reliability and make the PESD 204 more robust. By limiting the operation of the PESD 204 in this way with relatively tight operational constraints, the composition of the PESD 204 may be relaxed relative to other vehicle systems that rely on the PESD 204 to a wider range of operations. For example, in an embodiment in which the PESD 204 is one or more packs of lithium ion batteries, some of the battery cells may be permitted to vary from one another in terms of battery age, manufacturer, and operational health. Conventionally, such variation in cells would result in a greater risk of damage due to thermal runaway of one or more cells. But, limiting the load on the battery cells as described by the dual chemistry system described herein reduces the risk of thermal runaway to such an extent that some increased variation between the cells is permitted without a net increase in the risk of thermal runaway. The increased flexibility in the makeup of the battery pack or packs can reduce costs by allowing cell reuse, replacements, substitutions, and the like, without requiring mass cell uniformity.

Another consequence of strictly limiting the use of the PESD 204 to momentum operations is a reduction in the amount of heat generated by the PESD 204 relative to using the PESD 204 for acceleration operations. Due to the reduced heat output, in an embodiment the vehicle system does not include any active-cooling elements for cooling the PESD 204. For example, no energy-intensive liquid or cryogenic cooling of the PESD 204 is implemented. Rather, passive air-cooled elements may be utilized to cool the PESD 204. The air-cooled elements can be passive heat exchangers that discharge heat into the air that moves through and/or along the heat exchangers. Eliminating or reducing the use of active-cooling elements can reduce energy costs, weight, and part costs (if some of the active-cooling elements can be omitted entirely).

In one or more embodiments, the controller 208 controls the first and second switching devices 220A, 220B such that the propulsion circuit 214 and the ancillary circuit 216 do not concurrently conduct electric current (e.g., during a common time period). Stated differently, at least one of the first and second switching devices 220A, 220B are controlled to be in the open state at any given moment such that the switching devices 220A, 220B are never both in the closed, conducting state. The controller 208 maintains a break before make operating protocol to ensure only one, if any, of the switching devices 220A, 220B is closed at a time. The break before make protocol is utilized, in part, because of the different battery chemistries of the two electrical storage devices 204, 206. Typically, using different battery chemistries within a single vehicle propulsion system is not advised because of the unexpected interaction of energy densities within powered circuits. To avoid issues related to the unexpected interaction of energy densities, the switching devices 220A, 220B are controlled to prevent blending or mixing of current to and from the electrical storage devices 204, 206. For example, as described herein, the lower-density AESD 206 with quick charge/discharge may be used to provide initial movement functions (similar in function to first gear on an automobile transmission), and is electrically isolated from the large PESD 204 which is used for revenue service over greater distances. In an embodiment in which the propulsion circuit 214 has a shared segment with the ancillary circuit 216, the switching devices 220A, 220B are controlled to maintain the electrical isolation of the PESD 204 and the AESD 206 by ensuring that at least one of the switches 220A, 220B is in the open state at any given moment. In an embodiment in which the propulsion circuit 214 is entirely separate and discrete from the ancillary circuit 216, the switching devices 220A, 220B are controlled ensure that a traction motor does not concurrently receive current from both the PESD 204 and the AESD 206.

Referring back to FIG. 3, the controller 208 is configured to block the conduction of current along the ancillary circuit 216 prior to establishing the conduction of current along the propulsion circuit 214. The electrical storage devices 204, 206 are therefore utilized one at a time to power the traction motors 202. The controller 208 may be configured to prevent conduction of electrical current via the ancillary circuit 216 and the propulsion circuit 214 during a common time period, as described above. Upon opening the switching device 220 of the ancillary circuit 216, the controller 208 may immediately close the switching device 220 of the propulsion circuit 214 or may wait a designated amount of time (e.g., 10 ms, 1 s, or the like) before closing the switching device 220 of the propulsion circuit 214.

The end 314 of the elevated demand period 312 may be automatically triggered by the occurrence of one or more specific events. In one embodiment, the elevated demand period 312 ends in response to the available energy supply 306 of the AESD 206 reaching a designated level. For example, in the illustrated embodiment, the end 314 coincides with the available energy supply 306 reaching the depleted level 310 that indicates that an entirety of the available energy stored within the AESD 206 has been exhausted. The controller 208 may rely on the AESD 206 for powering the traction motors 202 until the AESD 206 is depleted and can no longer power the motors 202, at which point the controller 208 switches to the PESD 204 to provide power to the traction motors 202. In another example, the end 314 may occur in response to the available energy supply 306 of the AESD 206 reaching a designated non-zero available energy supply level that is greater than the depleted level 310. For example, the designated non-zero level may be 10%, 15%, 20%, or the like, of the full capacity of the AESD 206. One or more of the sensors 224 (shown in FIG. 2) of the vehicle 106 may be configured to monitor the available energy supply 306 of the AESD 206 over time, such that the controller 208 determines when the AESD 206 is depleted or is at the designated non-zero level based on data received from the one or more sensors 224.

In another embodiment, the end 314 of the elevated demand period 312 may be determined based on time elapsed from the start of the elevated demand period 312. For example, after time $t_0$, the controller 208 may wait a designated amount of time, such as one minute, two minutes, three minutes, or the like, before blocking the conduction of current along the ancillary circuit 216 at $t_1$ and thereafter establishing the conduction of current along the propulsion circuit 214. In yet another embodiment, the end 314 of the elevated demand period 312 may be determined based on movement characteristics of the vehicle 106. For example, the controller 208 may allow the AESD 206 to supply current to the traction motors 202 until a designated speed of the vehicle 106 is achieved or a designated distance is traveled by the vehicle 106, at which point the controller 208 blocks the conduction of current along the ancillary circuit 216 at time $t_1$. One of the sensors 224 (e.g., a speed sensor) may be utilized to monitor the speed of the vehicle 106 and the location determining device 228 may be utilized to monitor the distance traveled by the vehicle 106.

In yet another embodiment, the end 314 of the elevated demand period 312 may be determined based on the electrical load. For example, with reference to FIG. 4, the end 314 may occur upon the electrical load 404 dropping to and/or below the designated threshold 406.

Between the times $t_1$ and $t_2$, the PESD 204 supplies electric current along the propulsion circuit 214 to power the traction motors 202. The available energy supply 304 of the PESD 204 decreases during this time period such that the supply 304 at time $t_2$ is less than the full level 308. As described above, the PESD 204 may have a greater energy storage capacity and a slower discharge rate than the AESD 206. Thus, the available energy supply 304 of the PESD 204 between times $t_1$ and $t_2$ decreases more gradually than the available energy supply 306 of the AESD 206 during the elevated demand period 312. The available energy supply 306 of the AESD 206 remains constant between times $t_1$ and $t_2$ because the switching device 220 of the ancillary circuit 216 is in the open, non-conducting state.

The period from time $t_2$ to time $t_4$ represents a regenerative braking period 316. During the regenerative braking period 316, the vehicle 106 may be coasting such that the propulsion system 200 is not generating tractive effort. For example, the vehicle 106 may be traveling along a decline grade, braking, or the like. The traction motors 202 are utilized as generators to charge one or both of the electrical storage devices 204, 206 during the regenerative braking period 316. In an embodiment, the controller 208 is configured to charge both electrical storage devices 204, 206 one at a time in an order such that the AESD 206 is charged prior to the PESD 204. The AESD 206 may charge faster than the PESD 204, so the AESD 206 is charged first to attempt to fully charge the AESD 206 during the regenerative braking period 316.

At time $t_2$, the traction motors 202 are switched to a generator configuration to generate electric current based on rotation of the wheel sets 210, 212. At time $t_2$, the controller 208 opens the switching device 220 on the propulsion circuit 214 to block conduction of electric current along the propulsion circuit 214. As a result, the available energy supply 304 of the PESD 204 remains constant from time $t_2$ to time $t_3$. After opening the switching device 220 of the propulsion circuit 214, the controller 208 closes the switching device 220 on the ancillary circuit 216 at time $t_2$ to establish conduction of electric current from the traction motors 202 to the AESD 206 to charge the AESD 206. From time $t_2$ to time $t_3$, the AESD 206 charges to the full level 308. After the AESD 206 reaches the full level 308 at time $t_3$, the controller 208 blocks conduction of electric current along the ancillary circuit 216 (e.g., by opening the switching device 220 thereof) and then establishes conduction of electric current along the propulsion circuit 214 (e.g., by closing the switching device 220 thereof) to begin charging the PESD 204. While the PESD 204 charges between times $t_3$ and $t_4$, the available energy supply 304 of the PESD 204 increases while the available energy supply 306 of the AESD 206 remains constant. The PESD 204 charges more gradually than the AESD 206, as indicated by the greater slope of the available energy supply 306 between times $t_2$ and $t_3$ than the available energy supply 304 between times $t_3$ and $t_4$.

The regenerative braking period 316 ends at time $t_4$, as the traction motors 202 are utilized once again to provide tractive effort for propelling the vehicle 106 along the route. The PESD 204 may not be able to charge to full capacity before the regenerative braking period 316 ends. Between times $t_4$ and $t_5$, the PESD 204 supplies electric current to the traction motors 202 via the propulsion circuit 214. Time $t_5$ marks the start of another elevated demand period 312. Similar to the previous elevated demand period 312 to initiate movement of the vehicle 106, the controller 208 at time $t_5$ switches the switching device 220 on the propulsion circuit 214 to the open, non-conducting state and switches the switching device 220 on the ancillary circuit 216 to the closed, conducting state to supply electric current from the AESD 206 to the traction motors 202 via the ancillary circuit 216 (while preventing conduction of electric current via the propulsion circuit 214). The available energy supply 306 of the AESD 206 decreases during the elevated demand period 312 while the available energy supply 304 of the PESD 204 remains constant.

The start 318 of the elevated demand period 312 at time $t_5$ may be automatically triggered by the occurrence of one or more specific events. In one embodiment, the elevated demand period 312 starts in response to a monitored electrical load on the electrical storage devices 204, 206 exceeding a designated threshold. For example, with reference to FIG. 4, the electrical load 404 exceeds the designated threshold 406 at time $t_2$, which may correspond to time $t_5$ in the graph 300 shown in FIG. 3. In another embodiment, the start 318 of the elevated demand period 312 may occur in response to an incline grade of the route having or exceeding a designated degree angle. In yet another embodiment, the elevated demand period 312 may start in response to a designated throttle setting. For example, the controller 208 may automatically switch to the AESD 206 to supply current to the traction motors 202 in response to detecting that the vehicle 106 is traveling along an incline grade of a certain angle and/or detecting a certain throttle setting or a selected acceleration. The elevated demand period 312 may also be manually started by an operator using the I/O device 226.

In an embodiment, the PESD 204 is utilized as a main or primary energy source that powers the traction motors 202 during a majority of the trip. The collective time periods in which the PESD 204 supplies current to the motors 202 (e.g., from $t_1$ to $t_2$, from $t_4$ to $t_5$, and from $t_6$ on) may be greater than the collective time periods in which the AESD 206 supplies current to the motors 202 (e.g., from $t_0$ to $t_1$, and from $t_5$ to $t_6$). The collective amount of time of the elevated demand periods 312 may represent less than 5% or less than 10% of the total trip time. The use of the AESD 206 to provide relatively short bursts or periods of power can conserve the energy supply 304 of the PESD 204 and reduce strain and stress on the PESD 204.

Figure 5:
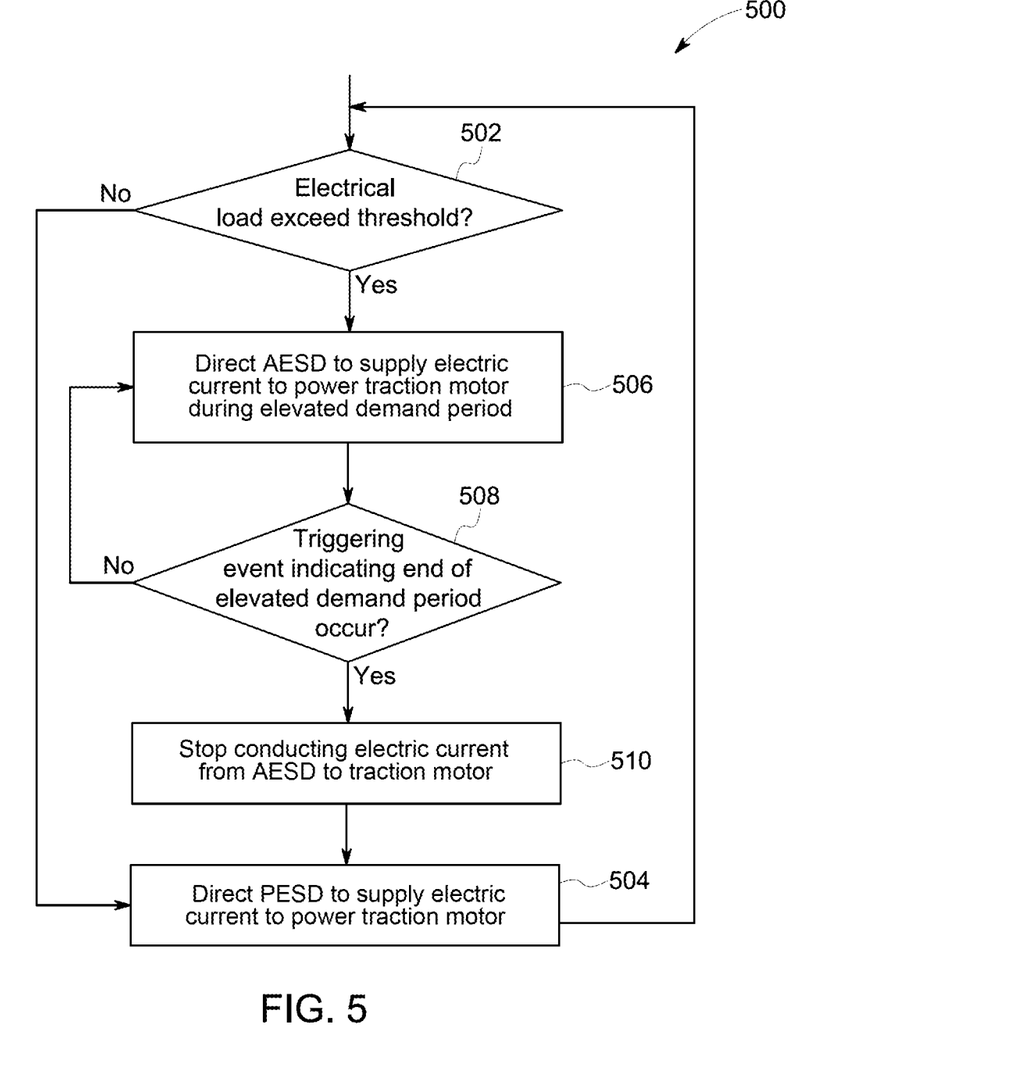
FIG. 5 is a flowchart of one embodiment of a method for powering a propulsion-generating vehicle along a route during a trip.

FIG. 5 is a flowchart of one embodiment of a method 500 for powering a vehicle along a route during a trip. More specifically, the method 500 may be for powering a traction motor to provide tractive effort to propel a locomotive along a track. The method 500 is described in connection with the propulsion system 200 of the vehicle 106 shown in FIG. 2. For example, in one embodiment the method 500 can be performed in full, or at least in part, by the controller 208 (e.g., the one or more processors 218 thereof) of the propulsion system 200.

At 502, it is determined whether an electrical load that is demanded on the propulsion system 200 exceeds a designated threshold. The electrical load may exceed the threshold in certain situations, such as when the vehicle 106 initiates movement from a stationary position and/or when the vehicle 106 accelerates or travels along an incline grade. The electrical load may be exerted or applied on one or both of the electrical storage devices 204, 206 that are used to power the traction motor 202. Although a single traction motor 202 is described with reference to the method 500, it is understood that the method 500 may be utilized to power multiple traction motors 202 to provide tractive efforts to propel the vehicle 106.

If the electrical load does not exceed the threshold at 502, the method 500 proceeds to 504 and a propulsion electrical storage device (PESD) 204 onboard the vehicle 106 is directed to supply electric current to the traction motor 202 via a propulsion circuit 214 to power the traction motor 202. The PESD 204 may be directed to supply electric current to the traction motor 202 by switching a switching device 220 on the propulsion circuit 214 to a closed, electrically-conducting state.

If, on the other hand, the electrical load exceeds the threshold, then the method 500 proceeds to 506. At 506, an ancillary electrical storage device (AESD) 206 onboard the vehicle 106 is directed to supply electric current to the traction motor 202 via an ancillary circuit 216 to power the traction motor 202. The AESD 206 supplies electric current to the traction motor 202 during an elevated demand period. In an embodiment, the PESD 204 does not supply current to the traction motor 202 during the elevated demand period.

At 508, a determination is made whether a triggering event indicating an end of the elevated demand period has occurred. The triggering event may be one or more of the AESD 206 exhausting an entirety of available energy supply stored within the AESD 206, the AESD 206 reaching a designated non-zero available energy supply stored within the AESD 206, a designated amount of time elapsing from the start of the elevated demand period, the vehicle 106 reaching a designated speed, the vehicle 106 reaching traveling a designated distance, or the like. If the triggering event has not occurred, then the method 500 returns to 506 and the AESD 206 remains conductively connected to the traction motor 202 (while the PESD 204 remains disconnected from the traction motor 202). If, on the other hand, the triggering event has occurred, then the method 500 proceeds to 510. At 510, conduction of electric current from the AESD 206 to the traction motor 202 via the ancillary circuit 216 is stopped. For example, the conduction may be stopped by switching a switching device 220 or another switching device on the ancillary circuit 216 to an open, non-conducting state. After stopping the conduction of electric current via the ancillary circuit 216 at 510, the method 500 proceeds to 504 and the PESD 204 is directed to supply electric current to the traction motor 202 via the propulsion circuit 214.

One or more technical effects of the systems and methods described herein include utilizing an ancillary electrical storage device 206 to power the traction motor 202 during periods of elevated demand to conserve the electrical energy supply of a main propulsion electrical storage device 204, enabling a greater range of travel before requiring a charge (e.g., relative to only using the main propulsion electrical storage device 204 to power the traction motor 202 along a trip). Another technical effect may include increasing the efficiency and operational lifetime of the main propulsion electrical storage device 204 by applying elevated loads on the ancillary electrical storage device 206 and applying reduced loads (e.g., less than the elevated loads) on the propulsion electrical storage device 204, which exerts less stress and strain on the propulsion electrical storage device 204 and causes less degradation than if the elevated loads were applied on the propulsion electrical storage device 204.

In at least one embodiment, a vehicle propulsion system is provided that includes a propulsion electrical storage device, a first switching device, an ancillary electrical storage device, a second switching device, and a controller having one or more processors. The propulsion electrical storage device is electrically connected to a traction motor of a vehicle via a propulsion circuit and is configured to power the traction motor to provide tractive effort to propel the vehicle. The first switching device is electrically connected to the propulsion circuit between the propulsion electrical storage device and the traction motor. The ancillary electrical storage device is electrically connected to the traction motor via an ancillary circuit and is configured to power the traction motor. The ancillary electrical storage device is a different type of electrical storage device than the propulsion electrical storage device. The second switching device is electrically connected to the ancillary circuit between the ancillary electrical storage device and the traction motor. The controller is operatively connected to the first and second switching devices. The controller is configured to switch or maintain the second switching device in a closed state during an elevated demand period for the ancillary electrical storage device to supply electric current to the traction motor via the ancillary circuit to power the traction motor. The controller is configured to switch the second switching device to an open state to block conduction along the ancillary circuit prior to switching the first switching device from the open state to the closed state to enable the propulsion electrical storage device to supply electric current to the traction motor via the propulsion circuit to power the traction motor.

Optionally, the controller is configured to control the first and second switching devices such that the propulsion circuit and the ancillary circuit do not both conduct electric current during a common time period. The propulsion circuit may be discrete from the ancillary circuit to electrically isolate the propulsion electrical storage device from the ancillary electrical storage device. Optionally, the first and second switching devices include or represent solid state switches. Optionally, the first and second switching devices include or represent optical switches Optionally, the controller is configured to switch the second switching device to the open state responsive to reaching an end of the elevated demand period. Optionally, the elevated demand period represents a period in which a power demand exceeds a designated non-zero threshold. The controller is configured to determine the end of the elevated demand period based on the power demand falling to or below the designated non-zero threshold.

Optionally, the ancillary electrical storage device charges and discharges faster than the propulsion electrical storage device. The propulsion electrical storage device may have a greater energy storage capacity than the ancillary electrical storage device. Optionally, the ancillary electrical storage device includes or represents ultra-capacitors, and the propulsion electrical storage device includes or represents lithium battery cells.

Optionally, during a regenerative braking period, the controller is configured to switch or maintain the second switching device in the closed state and the first switching device in the open state for the ancillary circuit to conduct electric current from the traction motor to the ancillary electrical storage device to charge the ancillary electrical storage device. The controller is configured to switch the second switching device to the open state to block the ancillary circuit from conducting electric current prior to switching the first switching device to the closed state for the propulsion circuit to conduct electric current from the traction motor to the propulsion electrical storage device to charge the propulsion electrical storage device. Optionally, the controller is configured to switch the second switching device to the open state during the regenerative braking period responsive to determining that the ancillary electrical storage device is at a full charge level.

Optionally, the elevated demand period occurs during initial movement of the vehicle from a stationary position. Optionally, the controller is operatively connected to a contactor on the ancillary circuit. The controller is configured to switch the contactor to a closed state to supply electric current from the ancillary electrical storage device to the traction motor via the ancillary circuit and is configured to switch the contactor to an open state to stop conducting electric current from the ancillary electrical storage device.

Optionally, the controller is configured to control the ancillary circuit to stop conducting electric current from the ancillary electrical storage device at the end of the elevated demand period prior to directing the propulsion electrical storage device to supply electric current to the traction motor via the propulsion circuit.

Optionally, the controller is configured to control the ancillary circuit to stop conducting electric current from the ancillary electrical storage device at the end of the elevated demand period responsive to the ancillary electrical storage device reaching a designated non-zero available energy supply stored within the ancillary electrical storage device.

Optionally, the controller is configured to control the ancillary circuit to stop conducting electric current from the ancillary electrical storage device at the end of the elevated demand period responsive to the ancillary electrical storage exhausting an entirety of available energy supply stored within the ancillary electrical storage device.

Optionally, the controller is configured to control the ancillary circuit to stop conducting electric current from the ancillary electrical storage device at the end of the elevated demand period responsive to a designated amount of time elapsing from a start of the elevated demand period.

Optionally, the propulsion system lacks an internal combustion engine.

Optionally, during a regenerative braking period, the controller is configured to control the ancillary circuit to conduct electric current from the traction motor to the ancillary electrical storage device to charge the ancillary electrical storage device prior to controlling the propulsion circuit to conduct electric current from the traction motor to the propulsion electrical storage device to charge the propulsion electrical storage device.

In at least one embodiment, a vehicle propulsion system is provided that includes a lithium ion battery pack, a first switching device, an ancillary electrical storage device, a second switching device, and a controller having one or more processors. The lithium ion battery pack is electrically connected to a traction motor of a vehicle via a propulsion circuit and is configured to power the traction motor to provide tractive effort to propel the vehicle. The first switching device is electrically connected to the propulsion circuit between the lithium ion battery pack and the traction motor. The ancillary electrical storage device is electrically connected to the traction motor via an ancillary circuit and is configured to power the traction motor. The ancillary electrical storage device includes or represents ultra-capacitors. The second switching device is electrically connected to the ancillary circuit between the ancillary electrical storage device and the traction motor. The controller is operatively connected to the first and second switching devices. The controller is configured to switch or maintain the second switching device in a closed state during an elevated demand period for the ancillary electrical storage device to supply electric current to the traction motor via the ancillary circuit to power the traction motor. The controller is configured to switch the second switching device to an open state to block conduction along the ancillary circuit prior to switching the first switching device from the open state to the closed state to enable the lithium ion battery pack to supply electric current to the traction motor via the propulsion circuit to power the traction motor.

Optionally, the first and second switching devices are solid state switches or optical switches. The controller may be configured to control the first and second switching devices such that the propulsion circuit and the ancillary circuit do not both conduct electric current during a common time period. Optionally, the propulsion circuit is discrete from the ancillary circuit to electrically isolate the propulsion electrical storage device from the ancillary electrical storage device.

In at least one embodiment, a vehicle propulsion system is provided that includes a lithium ion battery pack, a first switching device, an ancillary electrical storage device, a second switching device, and a controller having one or more processors. The lithium ion battery pack is electrically connected to a traction motor of a vehicle via a propulsion circuit. The lithium ion battery pack is configured to power the traction motor to provide tractive effort to propel the vehicle. The first switching device is electrically connected to the propulsion circuit between the lithium ion battery pack and the traction motor. The ancillary electrical storage device is electrically connected to the traction motor via an ancillary circuit and configured to power the traction motor. The ancillary electrical storage device includes ultra-capacitors. The second switching device is electrically connected to the ancillary circuit between the ancillary electrical storage device and the traction motor. The first and second switching devices are solid state switches or optical switches. The controller is operatively connected to the first and second switching devices and is configured control the first and second switching devices such that at least one of the first and second switching devices is in an open, non-conducting state at any given moment in time to ensure that the propulsion circuit and the ancillary circuit do not both conduct electric current during a common time period.

In an embodiment, a locomotive propulsion system includes a locomotive platform, plural axles and wheels operably coupled to the platform, and a traction motor attached to the platform and operably coupled to at least one of the axles. The system also includes a lithium-ion electrical storage device electrically connected to the traction motor via a propulsion circuit. The lithium-ion electrical storage device is configured to power the traction motor to provide tractive effort to propel the locomotive along a track. The system also includes an ancillary electrical storage device electrically connected to the traction motor via an ancillary circuit. The ancillary electrical storage device is a different type of electrical storage device than the lithium-ion electrical storage device. The system also includes a controller having one or more processors and operatively connected to the propulsion circuit and the ancillary circuit. The controller is configured to direct the ancillary electrical storage device to supply electric current to the traction motor via the ancillary circuit to power the traction motor during an elevated demand period, wherein, at an end of the elevated demand period, the controller is configured to control the ancillary circuit to stop conducting electric current from the ancillary electrical storage device and to direct the lithium-ion electrical storage device to supply electric current to the traction motor via the propulsion circuit to power the traction motor. The ancillary electrical storage device charges and discharges faster than the lithium-ion electrical storage device, and the lithium-ion electrical storage device has a greater energy storage capacity than the ancillary electrical storage device. The ancillary electrical storage device may include one or more ultracapacitors.

In at least one embodiment, a method (e.g., for powering a traction motor to provide tractive effort to propel a locomotive or other vehicle along a route) is provided. The method includes directing an ancillary electrical storage device onboard a vehicle to supply electric current to a traction motor onboard the vehicle via an ancillary circuit to power the traction motor during an elevated demand period. The ancillary electrical storage device is configured to power the traction motor to provide tractive effort to propel the vehicle along a track. The method includes controlling the ancillary circuit to stop conducting electric current from the ancillary electrical storage device at an end of the elevated demand period. Subsequent to stopping the conduction of electric current via the ancillary circuit, the method includes directing a propulsion electrical storage device onboard the vehicle to supply electric current to the traction motor via a propulsion circuit to power the traction motor. The propulsion electrical storage device is a different type of electrical storage device than the ancillary electrical storage device.

Optionally, the directing of the ancillary electrical storage device to supply electrical current to the traction motor via the ancillary circuit comprises switching a contactor on the ancillary circuit to a closed state. The controlling of the ancillary circuit to stop conducting electric current at the end of the elevated demand period comprises switching the contactor to an open state.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A vehicle propulsion system comprising:
   a propulsion electrical storage device electrically connected to a traction motor of a vehicle via a propulsion circuit, the propulsion electrical storage device configured to power the traction motor to provide tractive effort to propel the vehicle;
   a first switching device electrically connected to the propulsion circuit between the propulsion electrical storage device and the traction motor;
   an ancillary electrical storage device electrically connected to the traction motor via an ancillary circuit and configured to power the traction motor, the ancillary electrical storage device being a different type of electrical storage device than the propulsion electrical storage device;
   a second switching device electrically connected to the ancillary circuit between the ancillary electrical storage device and the traction motor; and
   a controller having one or more processors and operatively connected to the first and second switching devices, wherein the controller is configured to switch or maintain the second switching device in a closed state during an elevated demand period for the ancillary electrical storage device to supply electric current to the traction motor via the ancillary circuit to power the traction motor, and the controller is configured to switch the second switching device to an open state to block conduction along the ancillary circuit prior to switching the first switching device from the open state to the closed state to enable the propulsion electrical storage device to supply electric current to the traction motor via the propulsion circuit to power the traction motor.

2. The vehicle propulsion system of claim 1, wherein the controller is configured to control the first and second switching devices such that the propulsion circuit and the ancillary circuit do not both conduct electric current during a common time period.

3. The vehicle propulsion system of claim 1, wherein the propulsion circuit is discrete from the ancillary circuit to electrically isolate the propulsion electrical storage device from the ancillary electrical storage device.

4. The vehicle propulsion system of claim 1, wherein the ancillary electrical storage device charges and discharges faster than the propulsion electrical storage device, and the propulsion electrical storage device has a greater energy storage capacity than the ancillary electrical storage device.

5. The vehicle propulsion system of claim 1, wherein the ancillary electrical storage device comprises ultra-capacitors.

6. The vehicle propulsion system of claim 1, wherein the propulsion electrical storage device comprises lithium ion battery cells.

7. The vehicle propulsion system of claim 1, wherein the controller is configured to switch the second switching device to the open state responsive to reaching an end of the elevated demand period.

8. The vehicle propulsion system of claim 7, wherein the controller is configured to determine the end of the elevated demand period based on the ancillary electrical storage device reaching a designated non-zero available energy supply stored within the ancillary electrical storage device.

9. The vehicle propulsion system of claim 7, wherein the controller is configured to determine the end of the elevated demand period based on the ancillary electrical storage exhausting an entirety of available energy supply stored within the ancillary electrical storage device.

10. The vehicle propulsion system of claim 7, wherein the controller is configured to determine the end of the elevated demand period based on a designated amount of time elapsing from a start of the elevated demand period.

11. The vehicle propulsion system of claim 7, wherein the elevated demand period represents a period in which a power demand exceeds a designated non-zero threshold and the controller is configured to determine the end of the elevated demand period based on the power demand falling to or below the designated non-zero threshold.

12. The vehicle propulsion system of claim 1, wherein, during a regenerative braking period, the controller is configured to switch or maintain the second switching device in the closed state and the first switching device in the open state for the ancillary circuit to conduct electric current from the traction motor to the ancillary electrical storage device to charge the ancillary electrical storage device, the controller configured to switch the second switching device to the open state to block the ancillary circuit from conducting electric current prior to switching the first switching device to the closed state for the propulsion circuit to conduct electric current from the traction motor to the propulsion electrical storage device to charge the propulsion electrical storage device.

13. The vehicle propulsion system of claim 12, wherein the controller is configured to switch the second switching device to the open state during the regenerative braking period responsive to determining that the ancillary electrical storage device is at a full charge level.

14. The vehicle propulsion system of claim 1, wherein the first and second switching devices comprise solid state switches.

15. The vehicle propulsion system of claim 1, wherein the first and second switching devices comprise optical switches.

16. A vehicle propulsion system comprising:
a lithium ion battery pack electrically connected to a traction motor of a vehicle via a propulsion circuit, the lithium ion battery pack configured to power the traction motor to provide tractive effort to propel the vehicle;
a first switching device electrically connected to the propulsion circuit between the lithium ion battery pack and the traction motor;
an ancillary electrical storage device electrically connected to the traction motor via an ancillary circuit and configured to power the traction motor, the ancillary electrical storage device comprising ultra-capacitors;
a second switching device electrically connected to the ancillary circuit between the ancillary electrical storage device and the traction motor; and
a controller having one or more processors and operatively connected to the first and second switching devices, wherein the controller is configured to switch or maintain the second switching device in a closed state during an elevated demand period for the ancillary electrical storage device to supply electric current to the traction motor via the ancillary circuit to power the traction motor, and the controller is configured to switch the second switching device to an open state to block conduction along the ancillary circuit prior to switching the first switching device from the open state to the closed state to enable the lithium ion battery pack to supply electric current to the traction motor via the propulsion circuit to power the traction motor.

17. The vehicle propulsion system of claim 16, wherein the first and second switching devices are solid state switches or optical switches.

18. The vehicle propulsion system of claim 16, wherein the controller is configured to control the first and second switching devices such that the propulsion circuit and the ancillary circuit do not both conduct electric current during a common time period.

19. The vehicle propulsion system of claim 16, wherein the propulsion circuit is discrete from the ancillary circuit to electrically isolate the propulsion electrical storage device from the ancillary electrical storage device.

20. A vehicle propulsion system comprising:
a lithium ion battery pack electrically connected to a traction motor of a vehicle via a propulsion circuit, the lithium ion battery pack configured to power the traction motor to provide tractive effort to propel the vehicle;
a first switching device electrically connected to the propulsion circuit between the lithium ion battery pack and the traction motor;
an ancillary electrical storage device electrically connected to the traction motor via an ancillary circuit and configured to power the traction motor, the ancillary electrical storage device comprising ultra-capacitors;
a second switching device electrically connected to the ancillary circuit between the ancillary electrical storage device and the traction motor, wherein the first and second switching devices are solid state switches or optical switches; and a controller having one or more processors and operatively connected to the first and second switching devices, wherein the controller is configured control the first and second switching devices such that at least one of the first and second switching devices is in an open, non-conducting state at any given moment in time to ensure that the propulsion circuit and the ancillary circuit do not both conduct electric current during a common time period.

\* \* \* \* \*